July 24, 1951     J. I. HALL     2,561,922
VALVE FOR LIQUID SYSTEMS
Filed Dec. 22, 1945
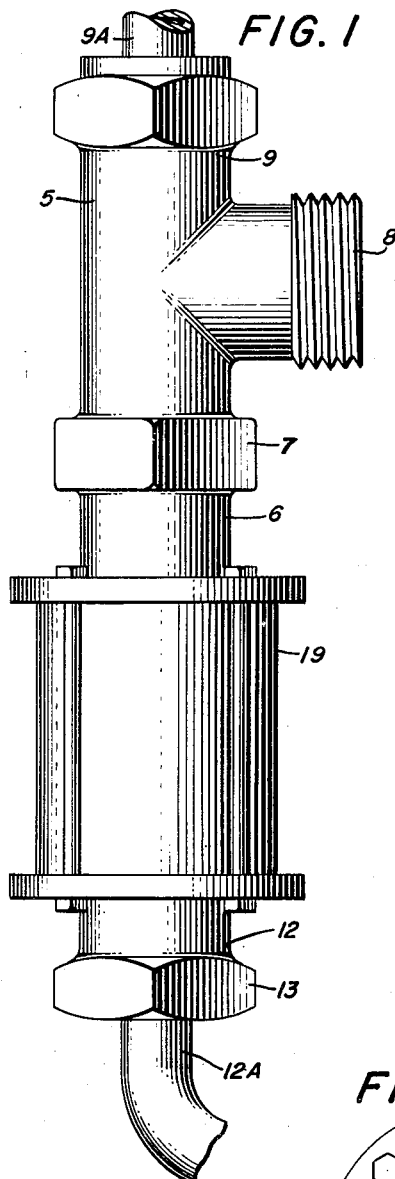
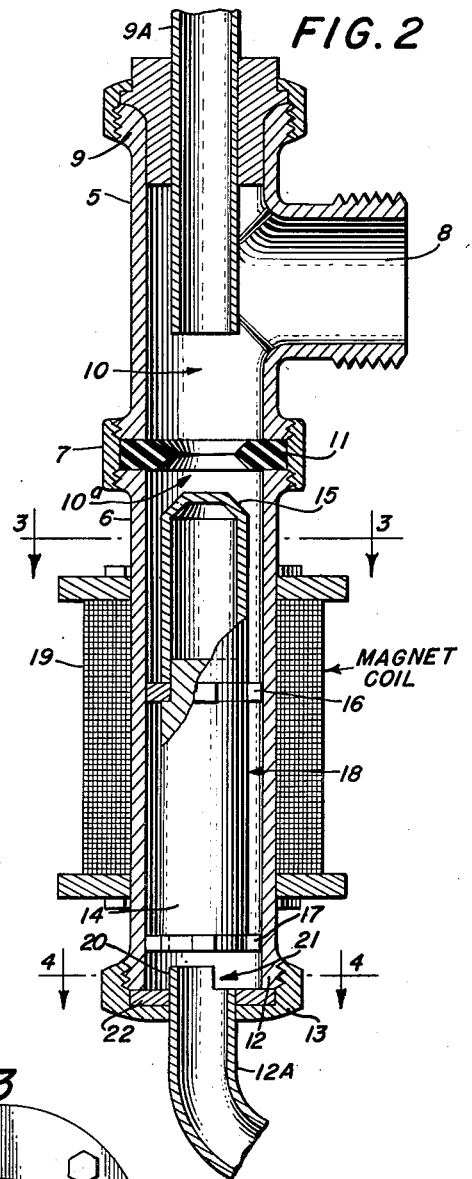
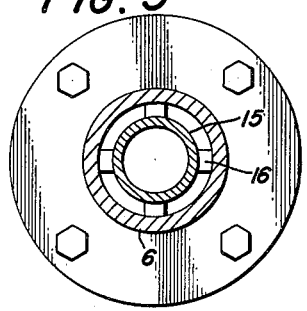
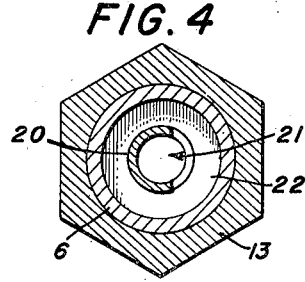
INVENTOR
JOHN IRVING HALL
By Carlson, Pitzner, Hubbard & Wolfe
ATTORNEYS Patented July 24, 1951

2,561,922

UNITED STATES PATENT OFFICE 2,561,922

VALVE FOR LIQUID SYSTEMS

John Irving Hall, New Britain, Conn., assignor, by mesne assignments, to Ex-Cell-O Corporation, Detroit, Mich., a corporation of Michigan Application December 22, 1945, Serial No. 636,577

9 Claims. (Cl. 137—139)

My invention relates to distribution systems and particularly to automatic valves for controlling or regulating the flow of liquid such for instance as in pasteurization.

In such systems, the liquid is heated to a predetermined temperature while circulating from a supply to a discharge point. The temperature of such liquid must be held within very narrow limits. This is commonly accomplished by the use of a thermally controlled flow diversion valve for automatically recirculating liquid to the heating apparatus should the temperature fall below a predetermined range, and for restoring normal circulation when the temperature has risen to a value falling within such range.

One object of the invention is to provide a valve of the character set forth and which may be readily disassembled for cleaning and quickly reassembled by relatively unskilled personnel.

Another object is to provide a valve of the foregoing type and comprising a minimum number of parts, thus lending itself to economical construction and repair.

A further object is to provide a fluid flow diversion valve which is susceptible of being actuated without external mechanical connections, thereby rendering such valve of particular but not exclusive utility in a substantially closed fluid circulating system.

Other objects and advantages will become apparent as the following detailed description proceeds, taken in connection with the accompanying drawings, wherein:

Figure 1 is a side view of a valve constituting an illustrative embodiment of the present invention.

Fig. 2 is a longitudinal sectional view through the valve of Fig. 1, showing in partial section the valve plunger, magnet core and solenoid.

Fig. 3 is a transverse sectional view through the body casing of the valve of Fig. 2 and taken in the plane of the line 3—3.

Fig. 4 is a transverse sectional view through the body casing and diversion outlet of the valve of Fig. 2 and taken in the plane of the line 4—4.

While the invention is susceptible of various modifications and alternative constructions, a preferred embodiment has been shown in the drawings and will be herein described in some detail, but it is to be understood that there is no intention to limit the invention to the specific form disclosed, the intention being, on the contrary, to cover all modifications and alternative constructions falling within the spirit and scope of the invention as expressed in the appended claims.

Referring more specifically to the drawings, it will be perceived that there is shown an illustrative embodiment of the invention in the form of a valve having a body comprising a first or upper casing member 5 and a second or lower casing member 6 detachably coupled together by an appropriate means such, for example, as a threaded collar 7. The upper casing member 5 is provided with a fluid inlet 8 and a normal flow outlet 9 located somewhat above the inlet 8 and in the present instance equipped with an upwardly extending outlet conduit or uptake 9A. Both the inlet 8 and the outlet conduit 9A communicate with a chamber 10 inside the upper casing member 5. In order to provide a ready means for diverting fluid from the outlet conduit 9A in the event of sub-standard operating conditions, the lower casing member 6 is formed with an internal bore or chamber 10A which communicates with the chamber 10 via a valve seat member 11 secured between the casing members 5, 6. In the present instance, the valve seat member 11 happens to be in the form of a resilient annular washer although other constructions might prove equally satisfactory. The lower casing member 6 is provided with a diversion outlet 12 which in the instant case happens to be located at the lower end of such casing member. Detachably connected to the diversion outlet 12 as by means of a nut or collar 13 is a diversion outlet conduit 12A which communicates freely with the chamber 10A.

Slidably disposed within the chamber 10A is a valve plunger 15 of which at least a substantial portion is comprised of magnetic material. In the illustrative valve, the plunger 15 includes a magnetic core 14 terminating at its upper end in a hollow tubular member which may be non-magnetic, such member having a substantially smaller mass than the core 14. The upper end of the plunger 15 has a frustoconical valve face and is adapted to close the opening in the resilient seat 11 which may be bevelled around both faces of its opening so that it can be reversed. The core 14 and plunger 15 are smaller in cross-sectional area than the inside of the casing member 6, the core having spacing spiders 16 and 17 secured adjacent its ends to guide it loosely in the bore or chamber 10A and permit liquid to pass freely through a passage 18 around the core and the plunger when the valve is in the open condition as shown in Fig. 2.

In order to actuate the valve plunger 15 without the use of external mechanical connections, a magnet coil or solenoid 19 is mounted so as to surround a portion of the lower body casing member 6. The solenoid 19 when thus mounted is adapted to control the movements of the core 14 and therefore the movements of the plunger 15. Consequently, when the solenoid is energized, its magnetic field exerts a lifting force which serves to raise the plunger into contact with the resilient valve seat 11. On the other hand, when the solenoid becomes deenergized the plunger 15 is permitted to drop away from the seat 11.

To prevent the magnet core 14 from closing the diversion outlet 12, I provide an appropriate stop abutment which will permit liquid to escape from the chamber 10A independently of the position of the core. For instance, the outlet conduit 12A may have an end portion 20 extending into the chamber 10A and constituting a fixed abutment against which the core will strike when dropped. The end portion 20 has an opening 21 in the side wall thereof which remains in constant communication with the chamber 10A, thereby effectively precluding blocking of the conduit 12A by the core 14. The outlet conduit 12A may be positioned by means of an annular end wall 22 which is clamped in place by a collar 13, the end portion 20 extending into the chamber 10A substantially beyond the wall 22.

Upon reflection, it will be appreciated that the body casings 5 and 6, together with their connecting collar 7, are susceptible of being readily connected and disconnected for the purpose of construction, inspection and cleaning. In addition, the magnetic valve plunger is simple and easily made, installed and cleaned.

In normal operation, the coil will be energized and hold the plunger 15 in closed-valve position against the seat 11 so that liquid will flow uninterruptedly into the chamber 10 and out the normal flow discharge outlet 9. In case the condition of the liquid or its flow should become sub-normal, the coil can be deenergized by means of a thermostatic switch or the like thus allowing the valve plunger 15 to fall into its open-valve position. This establishes communication via the valve seat member 11 and the chambers 10, 10A between both the inlet 8 and the normal flow outlet 9 of the upper body casing 5, on the one hand, and the diversion outlet 12 of the lower body casing 6, on the other hand. Consequently, fluid is drained into the diversion outlet 12 from the inlet 8 and the normal flow outlet 9 past the seat member 11, the plunger 15 and the stop abutment, and thence to the diversion outlet conduit 12A.

When the electrical circuit is again completed, the coil will be energized, the plunger lifted and the valve closed so that fluid will again pass out of the chamber 10 via the normal flow outlet and the conduit 9A.

It will be obvious to those skilled in the art that the foregoing construction is susceptible of precluding entry of sub-standard fluid into the normal flow outlet when the plunger is in its open-valve position. This becomes possible largely because the diversion outlet offers a substantially lower resistance head than said normal flow outlet. What is not so obvious, yet highly important, is the fact that the valve is capable of automatically recalling and diverting a quantity of sub-standard fluid which has already passed out through the normal flow outlet and into the uptake conduit prior to opening of the valve. Where the valve is controlled as by means of a temperature responsive instrument, the volume of fluid in the uptake may be so related to the time lag of the instrument as to compensate for this time lag and effect the recall and diversion of substantially all such volume.

In certain instances it may be desirable to extend the end of the outlet conduit 9A well into the chamber 10, as shown in Fig. 2, so as to define a restricted area below the inlet 8. With the valve plunger 15 in the depressed or open position, the resulting flow of fluid from the inlet 8 across the restricted area tends to set up a suction on the outlet conduit 9.

Another point which should not be overlooked is the fact that in the event of power failure, the valve plunger automatically drops into its open-valve or diverting position. Since it is highly probable that a power failure will result in the production of sub-standard fluid in the system in which the valve is used, the value of such a safeguard can easily be appreciated.

I claim:

1. A valve case containing a magnetic plunger having a valve tip at its upper end, a valve seat in the casing above said tip, an inlet to the casing above the valve seat, a discharge outlet above said valve seat and another outlet at the lower end of the casing, said casing having a passage around the plunger, and a magnet coil surrounding the part of the casing containing the magnetic plunger, the outlet in the lower end of the casing having a portion defining a stop and extending into the casing for preventing the closing of said latter outlet by said plunger.

2. A valve unit comprising upper and lower casing members detachably connected with a valve seat secured between them, said upper casing member having an inlet member and an outlet member, a magnet core slidable in the lower casing member and having a valve face on its upper end, said valve face and core being sufficiently smaller in cross-sectional area than the interior of the casing to leave a passage to an outlet in the lower part of the casing, and a magnet coil surrounding a portion of the lower casing member, the outlet member in said upper casing extending outwardly of one end of said upper casing and inwardly thereof beyond the inlet whereby said outlet member is normally under suction when the valve is open.

3. A fluid flow diversion valve comprising first and second casing members detachably connected with a resilient valve seat between them, said first casing member having an inlet and an outlet, a magnet core slidable in the second casing member and carrying a hollow valve plunger of substantially smaller mass than said core, the lateral dimensions of said core and valve plunger being sufficiently smaller in cross-sectional area than the interior of the second casing member to leave a passage to an outlet in the lower portion of said member, and a magnet coil mounted so as to surround a portion of said second casing member for actuating said valve plunger by means of said core.

4. A valve for controlling the flow of fluid in a fluid conditioning system and comprising, in combination, a first casing member having a chamber together with an inlet and an outlet communicating with the chamber, a second casing member also having a chamber together with an outlet communicating therewith, a valve seat member, means for detachably coupling said casing members with their chambers in communication via said valve seat member, a valve plunger slidably mounted in the chamber of said second casing member and having sufficient peripheral clearance to permit a flow of fluid in said chamber longitudinally past said plunger, at least a portion of said plunger being of magnetic material, and a solenoid mounted in surrounding relationship with respect to said second casing member for actuating said valve plunger.

5. A liquid flow diversion valve comprising, in combination, first and second body casings detachably connected for communication via a resilient valve seat, said first body casing having an inlet and an outlet, said second body casing having a longitudinal bore therein, a valve plunger slidably disposed within the bore in said second body casing for cooperation with said resilient valve seat, said valve plunger having at least a substantial portion thereof formed of magnetic material, a solenoid surrounding said second body casing and adapted to actuate said valve plunger therein, the cross-sectional area of said plunger being sufficiently smaller than the bore of said second body casing to permit liquid to flow longitudinally of the bore, and an abutment fixed to said second body casing and extending into the bore thereof for interception of said plunger without interruption of fluid flow from said bore.

6. A valve for regulating the flow in a fluid conditioning system and comprising the combination of an upper body casing having an inlet and a normal flow outlet above said inlet, a lower body casing having a diversion outlet, a valve seat member, coupling means for joining said body casings together for communication via said valve seat member, a magnetic valve plunger slidably mounted in said lower body casing, means defining a longitudinal fluid passage between said plunger and the interior of said lower body casing, said plunger having one operative position wherein it abuts said valve seat so as to block communication between said upper and lower body casings, said plunger also having a second operative position spaced from said valve seat so as to permit a flow of fluid from both the inlet and the normal flow outlet of said upper body casing through the diversion outlet of said lower body casing via said valve seat, and a solenoid mounted in encircling relation with said lower body casing for shifting said magnetic valve plunger from one to the other of its operative positions.

7. A fluid flow diversion valve comprising, in combination, a first body casing having an inlet and a normal flow outlet, a second body casing having a diversion outlet, a valve seat member, a coupling for joining said body casings together for communication via said valve seat member, a magnetic valve plunger slidably mounted within said second body casing, the cross-sectional area of said plunger being smaller than that of the interior of said second body casing to permit a flow of fluid longitudinally past said magnetic valve plunger, said plunger having one operative position defined by said valve seat member wherein the latter and said plunger coact to preclude communication between said first and said second body casings, a stop in said second body casing defining a second operative position for said plunger wherein the same is spaced from said valve seat member permitting communication between both the inlet and the normal flow outlet of said first body casing and the diversion outlet of said second body casing, and a solenoid mounted about said second body casing for shifting said magnetic valve plunger from one to the other of its operative positions.

8. A fluid flow diversion valve comprising, in combination, a body having a lower chamber and an upper chamber, an inlet in said body communicating with the upper chamber, a normal flow outlet in said body also communicating with the upper chamber, said normal flow outlet being located above said inlet, a diversion outlet communicating with the lower chamber, a removable valve seat member interposed between said body chambers, a removable stop member mounted in spaced relation from said valve seat member, a valve plunger having at least a substantial portion thereof comprised of magnetic material, said plunger being slidably housed within said lower chamber and susceptible of movement between an open-valve position defined by said stop and a closed-valve position defined by said valve seat member, said plunger in its open-valve position being adapted to drain both said inlet and said normal flow outlet into said diversion outlet, said plunger in its closed-valve position being adapted to establish an uninterrupted flow of fluid from said inlet to said normal flow outlet, and a control solenoid surrounding a portion of said body for shifting said plunger between its open-valve and its closed-valve positions.

9. A diversion valve for a fluid conditioning system and comprising the combination of a body having a valve seat member therein defining a lower chamber and an upper chamber, an inlet in said body communicating with the upper chamber, a normal flow outlet in said body also communicating with the upper chamber, said normal flow outlet being located above said inlet, a diversion outlet communicating with the lower chamber, a valve seat member interposed between said body chambers, a stop member in said lower chamber mounted in spaced relation below said valve seat member and adjacent said diversion outlet, a magnetic valve plunger slidably housed within said lower chamber and susceptible of movement between a normally depressed open-valve position defined by said stop and a closed-valve position defined by said valve seat member, means defining a longitudinal fluid passage between said plunger and the walls of said lower chamber, said plunger in its open-valve position being adapted to channel fluid from said inlet to said diversion outlet and to recall fluid from said normal flow outlet draining the same into said diversion outlet, said plunger in its closed-valve position being adapted to preserve an uninterrupted flow of fluid from said inlet to said normal flow outlet, and a control solenoid adapted when energized to hold said plunger in its closed-valve position, said solenoid being adapted when deenergized to permit return of said plunger to its open-valve position.

JOHN IRVING HALL.

REFERENCES CITED

The following references are of record in the file of this patent:

UNITED STATES PATENTS

| Number | Name | Date |
|---|---|---|
| 193,087 | Holly | July 17, 1877 |
| 483,108 | Frank | Sept. 20, 1892 |
| 571,833 | Hunter | Nov. 24, 1896 |
| 1,085,425 | Hobe et al. | Jan. 27, 1914 |
| 2,405,127 | Beach | Aug. 6, 1946 |

FOREIGN PATENTS

| Number | Country | Date |
|---|---|---|
| 151,789 | Austria | Dec. 10, 1937 |
| 208,703 | Great Britain | July 10, 1924 |